(12) United States Patent
Lebowitz et al.

(10) Patent No.: US 7,597,745 B2
(45) Date of Patent: Oct. 6, 2009

(54) FILTER MATERIALS FOR ADSORBING HYDROCARBONS

(75) Inventors: Jeffrey I. Lebowitz, Drexel Hill, PA (US); Joseph W. Lovette, Newark, DE (US); Chiu Y. Chan, Wilmington, DE (US)

(73) Assignee: Foamex Innovations Operating Company, Media, PA (US)

( * ) Notice: Subject to any disclaimer, the term of this patent is extended or adjusted under 35 U.S.C. 154(b) by 641 days.

(21) Appl. No.: 11/278,443

(22) Filed: Apr. 3, 2006

(65) Prior Publication Data

US 2006/0205830 A1 Sep. 14, 2006

Related U.S. Application Data

(63) Continuation-in-part of application No. 10/833,857, filed on Apr. 28, 2004, now abandoned.

(51) Int. Cl.
B01D 53/02 (2006.01)
C08G 18/22 (2006.01)

(52) U.S. Cl. ............................ 95/146; 95/143; 95/900; 95/901; 95/902; 96/121; 96/131; 96/132; 96/153; 96/154; 55/385.3; 55/486; 55/487; 55/495; 55/512; 55/514; 55/520; 55/523; 55/524; 55/528

(58) Field of Classification Search ............... 96/108, 96/121, 131, 132, 153, 154; 95/143, 146, 95/900, 901, 902; 55/385.3, 482, 486, 487, 55/495, 512, 514, 520, 523, 524, 528

See application file for complete search history.

(56) References Cited

U.S. PATENT DOCUMENTS

| | | |
|---|---|---|
| 3,238,056 A | 3/1966 | Pall et al. |
| 3,805,493 A | 4/1974 | Kennedy et al. |
| 3,865,758 A | 2/1975 | Yoshida et al. |
| 4,046,939 A | 9/1977 | Hart |
| 4,331,555 A | 5/1982 | Baskent et al. |
| 4,637,383 A | 1/1987 | Lopez |
| 4,750,863 A | 6/1988 | Scoggins |
| 4,800,190 A | 1/1989 | Smolik |
| 4,883,052 A | 11/1989 | Weiss et al. |
| 4,906,263 A | 3/1990 | von Blücher et al. |
| 4,981,501 A | 1/1991 | Von Blücher et al. |
| 4,992,084 A | 2/1991 | Von Blücher et al. |
| 5,226,937 A | 7/1993 | Linnersten et al. |
| 5,275,154 A | 1/1994 | Von Blücher et al. |
| 5,281,437 A | 1/1994 | Singh |
| 5,288,307 A | 2/1994 | Goltz et al. |
| 5,338,253 A | 8/1994 | Damsohn et al. |

(Continued)

FOREIGN PATENT DOCUMENTS

EP 1 110 593 A1 6/2001

(Continued)

*Primary Examiner*—Jason M Greene
(74) *Attorney, Agent, or Firm*—Connolly Bove Lodge & Hutz LLP (57) ABSTRACT

A porous filter medium forms a filter or liner for extracting hydrocarbons from vapors emitted from a motorized vehicle, device or appliance fuel tank. The filter medium is a polymer network of a foam, nonwoven or collection of particles and has fine pore size and a butane working capacity (W/W %) of 4.0 percent or higher.

18 Claims, 5 Drawing Sheets

U.S. PATENT DOCUMENTS

| | | | |
|---|---|---|---|
| 5,393,329 A | 2/1995 | Inagaki et al. | |
| 5,395,428 A * | 3/1995 | von Blucher et al. | 95/146 |
| 5,413,714 A | 5/1995 | DeFilippi et al. | |
| 5,538,543 A | 7/1996 | Watanabe et al. | |
| 5,562,757 A | 10/1996 | Brun et al. | |
| 5,616,169 A | 4/1997 | de Ruiter et al. | |
| 5,762,692 A | 6/1998 | Dumas et al. | |
| 5,769,992 A | 6/1998 | Smolik | |
| 5,807,424 A | 9/1998 | de Ruiter et al. | |
| 5,820,644 A | 10/1998 | Mori et al. | |
| 5,820,927 A | 10/1998 | Oehler et al. | |
| 5,871,569 A | 2/1999 | Oehler et al. | |
| 5,914,294 A | 6/1999 | Park et al. | |
| 5,944,873 A * | 8/1999 | Jager et al. | 95/141 |
| 6,022,399 A * | 2/2000 | Ertl et al. | 95/147 |
| 6,040,266 A * | 3/2000 | Fay et al. | 502/439 |
| 6,083,857 A | 7/2000 | Bottger et al. | |
| 6,096,277 A * | 8/2000 | Campbell et al. | 95/138 |
| 6,197,079 B1 | 3/2001 | Mori et al. | |
| 6,296,691 B1 * | 10/2001 | Gidumal | 96/154 |
| 6,402,819 B1 * | 6/2002 | De Ruiter et al. | 96/154 |
| 6,464,761 B1 * | 10/2002 | Bugli | 55/524 |
| 6,540,815 B1 | 4/2003 | Hiltzik et al. | |
| 6,589,321 B2 | 7/2003 | Kames | |
| 6,652,627 B1 * | 11/2003 | Tonkovich et al. | 95/143 |
| 6,692,551 B2 | 2/2004 | Wernholm et al. | |
| 6,726,745 B2 * | 4/2004 | Tuma et al. | 96/153 |
| 6,752,853 B2 * | 6/2004 | Simpson et al. | 95/143 |
| 6,814,786 B1 | 11/2004 | Zhuang et al. | |
| 7,160,361 B2 * | 1/2007 | Meiller et al. | 95/143 |
| 7,182,802 B2 * | 2/2007 | Bause et al. | 95/146 |
| 2002/0018884 A1 | 2/2002 | Thomson | |
| 2002/0178706 A1 | 12/2002 | Kvietok et al. | |
| 2003/0140794 A1 | 7/2003 | Wang et al. | |
| 2004/0118287 A1 | 6/2004 | Jaffe et al. | |
| 2004/0182240 A1 | 9/2004 | Bause et al. | |

FOREIGN PATENT DOCUMENTS

| | | |
|---|---|---|
| WO | WO-98/16296 | 4/1998 |

* cited by examiner

FILTER MATERIALS FOR ADSORBING HYDROCARBONS

CROSS-REFERENCE TO RELATED APPLICATION

This application is a continuation-in-part of U.S. patent application Ser. No. 10/833,857, filed Apr. 28, 2004, now abandoned.

FIELD OF THE INVENTION

This invention relates to a filter material to capture hydrocarbon evaporative emissions, such as during refueling, to prevent or limit such hydrocarbons from being emitted into the atmosphere, and to evaporative emission control systems incorporating such filter material and flow-by liners formed with such filter material.

BACKGROUND OF THE INVENTION

Environmental Protection Agency ("EPA") regulations require gasoline and diesel powered passenger cars and light trucks to incorporate on board hydrocarbon refueling emissions controls. As fuel is introduced into a motor vehicle's tank, the displaced vapors from the tank are directed to the refueling emissions controls. The goal is for the on board system to capture about 95 percent of the refueling emissions to limit the amount of volatile organic compounds ("VOCs") and toxins emitted into the atmosphere during refueling. The VOCs that evaporate from gasoline during vehicle refueling contribute to urban ozone or smog formation.

Currently, vehicles use activated carbon-filled canisters to capture evaporative emissions. Carbon is "activated" by treating with steam or chemicals to increase porosity and generate a high surface area so that the activated carbon more readily adsorbs various chemical species. The activated carbon in the canister either is in the form of loose powders, granules or pellets, or in the form of a honeycomb extrusion, or a combination of these. The gas tank and fill pipe are designed so that when refueling the vehicle, fuel vapors in the tank travel to the activated carbon-packed canister where the vapors are adsorbed. Each filled canister weighs up to about 10 pounds. The carbon granules or pellets settle after being subjected to vehicle movement, which can change the flow path and alter filter performance. Carbon powders, granules or pellets generate dust, and the honeycomb extrusions lack significant vibrational stability, leading to breakage and dust generation. Lower cost, lighter weight, more resilient and more reliable alternatives to the activated carbon-packed canisters are sought.

One activated carbon canister system is shown in U.S. Pat. No. 6,540,815 (Hiltzik). In this patent, an emissions control system canister has a vent side that incorporates multiple beds of adsorbent materials that may be spaced apart by inert fillers or voidages, or has an adsorbent-containing monolith, such as a honeycomb, that has a desired void volume. When used, the inert fillers can be porous mats of foam. Such vent side absorbents are stated to have butane adsorption of about 6 g/dL. The '815 patent mentions activated carbon formed from various raw materials, including porous polymers, as a hydrocarbon adsorbent. In the working examples, the '815 patent uses foams only as inert or nonadsorbing material in combination with adsorbing activated carbon pellets. Such foams are not identified as hydrocarbon vapor adsorbents.

U.S. Pat. 6,464,761 (Bugli) discusses an air induction filter assembly that includes a reticulated multi-layer foam with carbon impregnation to remove residual hydrocarbon vapors diffusing through the inlet manifold of an engine after the engine is shut off. The '761 patent states that the carbon impregnated foam layer is optional in non-automotive applications where hydrocarbon adsorption is not required.

Foams have been used as fluid filtering media for different applications. SIF® foams from Foamex International Inc. of Linwood, Pa. are reticulated flexible polyester or polyether urethane foams with pore sizes from 10 to 110 pores per linear inch that may be used, for example, as gasoline fuel filters in chainsaws and other small engines. These foams filter particulates from liquids. PROTECTAIR® II foams, also from Foamex International, are reticulated polyether foams with pore sizes from 20 to 35 pores per linear inch that may be used, for example, in air filters to filter particulates from an air stream. Heretofore, such foams have not been used to adsorb hydrocarbons entrained in a gas stream.

In the 1980's, Scottfoam Corporation, a predecessor to Foamex International, offered an activated charcoal impregnated SIF® foam for use as a shoe sole insert under the trademark SORBACELL™. The Technical Data Sheet for this foam indicates that the foam was impregnated with high loadings (2 oz./square yard) of finely divided activated carbon particles, which allowed the coated foam to remove particulate material and adsorb some gaseous contaminants from an air stream.

Thus, the background art considered it necessary to treat or coat urethane or polymer filter material, such as foam, with activated carbon or other hydrocarbon adsorbent material in order to have a satisfactory butane working capacity and satisfactory hydrocarbon adsorption. Coated foams, however, can have higher weight, can be less resilient and can be more apt to generate particle contamination from flaking. Thus, it would be desirable to have a lower weight and more resilient filter material with satisfactory butane working capacity for use in evaporative hydrocarbon emissions systems.

In addition, automotive and engine-powered equipment manufacturers continue to seek systems and methods to reduce hydrocarbon emissions throughout the fuel and exhaust systems. To accomplish this, it would be desirable to have a low weight material to adsorb hydrocarbon gases that can be attached to or associated with regular and nonregular surfaces within a fuel and exhaust system.

SUMMARY OF THE INVENTION

A first aspect of the invention is a method for removing or extracting hydrocarbons from a gaseous stream emitted from a fuel tank during refueling a motor vehicle, device or appliance with a hydrocarbon-based fuel consuming engine. According to the method, a filter is installed in a flow path established between the fuel tank and an exhaust from the fuel tank. The filter comprises one or more foam blocks that have been coated with an adsorbent particle coating. The blocks may be aligned in stacked relation within a canister. The foam forming said blocks has a pore count between about 45 and 300 pores per inch, and may be reticulated. In addition, each foam block defines at least one channel formed therein through which a gas may flow. The filter has a butane working capacity on a weight percent basis (W/W %) of at least about 4.0 percent, more preferably at least about 8.0 percent.

The adsorbent particle coating optionally may include activated carbons, silicas, silicates, aluminosilicates, filter agents, molecular sieves, flame retardants, electrically conductive materials, antimicrobial additives, germicides, pigments and colorants.

A second aspect of the invention is a system for extracting evaporative hydrocarbon emissions from a motorized vehicle, device or appliance that includes a housing defining an inner chamber; an inlet through which a gas stream containing a hydrocarbon enters the inner chamber; an outlet from which a gas stream exits the inner chamber; and a filter in the inner chamber, said filter comprising one or more foam blocks that have been coated with an adsorbent particle coating, wherein the foam forming said blocks has a pore count between about 45 and 300 pores per inch, such as between about 45 to 80 pores per inch, and further wherein each foam block defines at least one channel formed therein through which a portion of the gas stream may flow. The filter in the system preferably has a butane working capacity (W/W %) of at least about 4.0 percent, preferably at least about 8.0 percent.

The adsorbent particle coating optionally may include one or more of activated carbons, silicas, silicates, aluminosilicates, filter agents, molecular sieves, flame retardants, electrically conductive materials, antimicrobial additives, germicides, pigments and colorants. The foam may be reticulated before the coating is applied, and may have an air permeability of 0.1 to 20 inches water pressure drop. Preferably, the foam is one of polyether polyurethane foam, polyester polyurethane foam and melamine foam.

A third aspect of the invention is a liner for adsorbing hydrocarbons. The liner comprises a layer of polyurethane foam defining a top surface and a bottom surface, wherein the foam has a pore count of about 80 to 300 pores per inch and has been coated with a hydrocarbon adsorbing particle coating. An adhesive is supplied on the bottom surface of the coated foam layer for adhesively attaching the coated foam layer to a substrate.

BRIEF DESCRIPTION OF THE DRAWINGS

The present invention will be described in the following detailed description with reference to the following drawings.

DETAILED DESCRIPTION OF THE PREFERRED EMBODIMENTS

Figure 1:
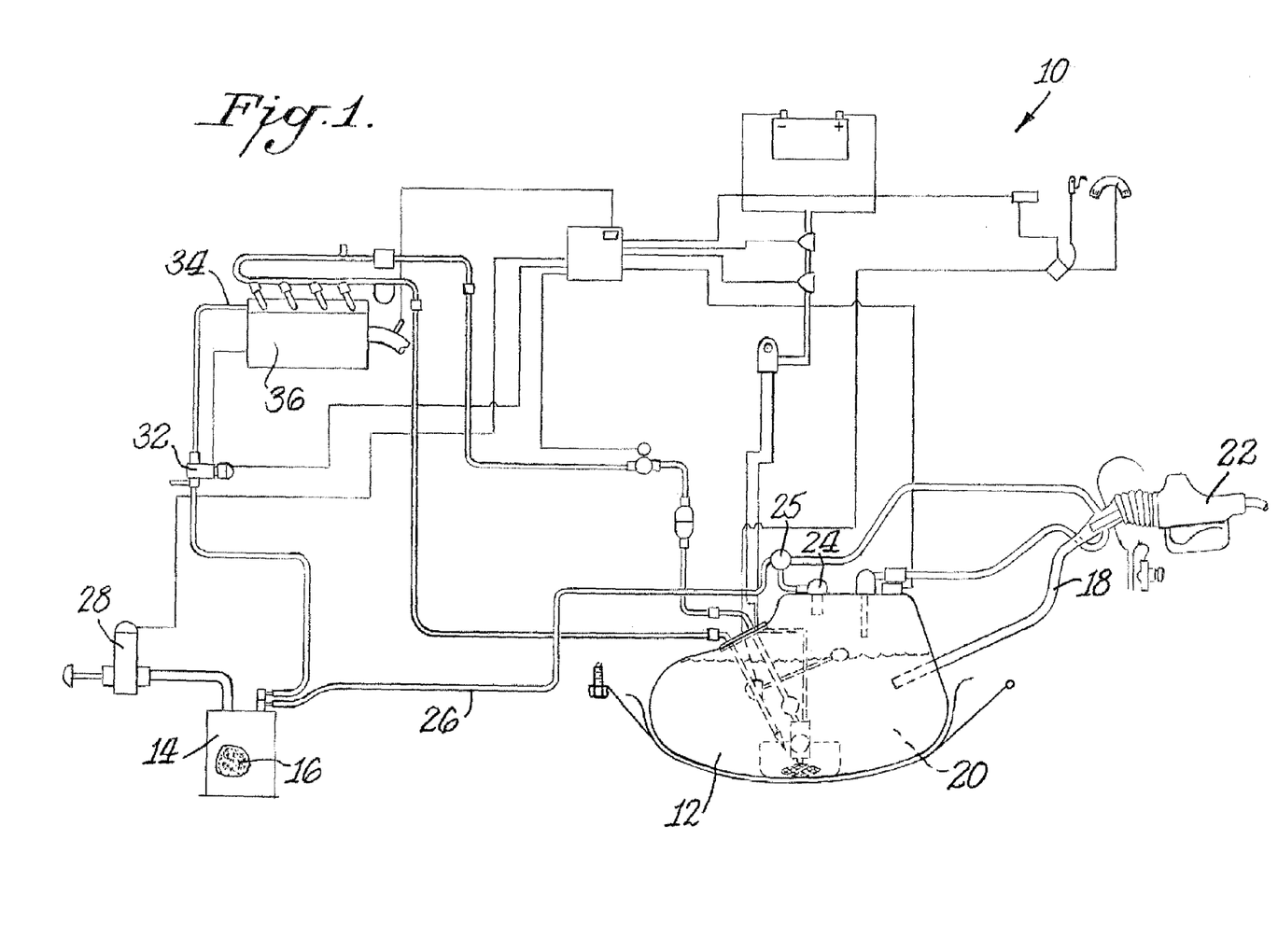
FIG. 1 is a schematic diagram of a fuel system with enhanced evaporative emissions control for capturing hydrocarbon vapors emitted during refueling which includes a filter canister containing a filter material according to the invention.

Referring first to FIG. 1, a fuel system 10 with enhanced evaporative emissions controls has a fuel tank 12 into which fuel 20 may be poured from pump nozzle 22 via fuel inlet 18. The tank is provided with a fuel tank vent valve 24 in fluid communication with a control valve 25 that in turn is in fluid communication with a fuel tank vent tube and fittings 26 leading to the canister 14 that is filled with an a filter 16. A canister vent valve 28 and purge line 30 are provided as outlets from the canister 14. The canister purge line 30 leads to a purge vapor management valve 32 in fluid communication with a purge port 34 to the fuel injectors of the engine 36 and the exhaust therefrom.

As liquid hydrocarbon fuel, such as gasoline, is pumped via nozzle 22 into the fuel tank 12, the gas vapors in the vapor space above the fuel in the tank are displaced by the liquid fuel 20. Such displaced gas vapors are not permitted to escape from the fuel tank to the atmosphere. Rather, such gas vapors flow from the tank through the fuel tank vent valve 24 and control valve 25 into the fuel tank vent tube and fittings 26 leading to the canister inlet. The gas vapors pass through the filter 16 within the canister 14 wherein a substantial portion of the hydrocarbon species in the gas vapors are drawn out of the vapor and attach to the filter 16. The gaseous fluid emitted from the filter 16 then flows through the purge line 30 and through the purge vapor management valve 32 to the purge port 34 into the fuel injector manifold in the engine 36.

Figure 2:
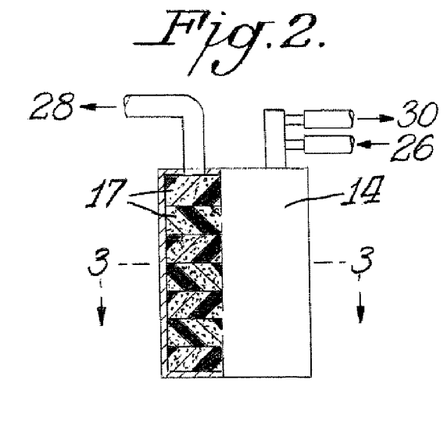
FIG. 2 is a front elevational view in partial cross section of a first embodiment of a filter canister containing a stack of filter material disks according to the invention.
Figure 3:
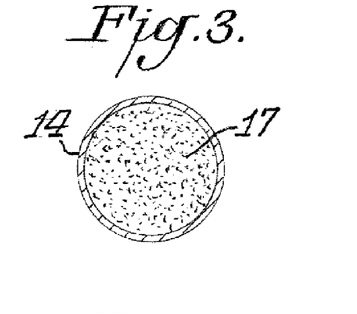
FIG. 3 is a cross-sectional view taken along line 3-3 in FIG. 2.

Referring next to FIGS. 2 and 3, a system for evaporative hydrocarbon emissions control has a canister 14 that is formed as a generally cylindrical housing from materials resistant to corrosion, including aluminum, stainless steel, plastics and composite materials. The housing defines a cylindrical chamber for holding a filter medium. While the canister 14 is illustrated as having a generally cylindrical shape, other cross-sectional shapes are possible. The canister dimensions are selected so that the canister will fit within space within the exhaust system and so that the sufficient vapor flow rates through the canister may be maintained.

The filter medium shown in FIG. 2 comprises multiple cylindrical blocks 17 of urethane foam inserted inside the chamber. The cylindrical blocks 17 are stacked one atop the other to fill the chamber. For example, each cylindrical block may have a diameter of about three inches and a thickness of about one inch. The blocks may be of the same or different urethane foam or other hydrocarbon absorbing material. The blocks may be of different shape besides cylindrical to fit within chambers having different inner housing configurations. Alternatively, the filter medium may be formed as a one-piece block or monolith of foam that fills the chamber.

Figure 4:
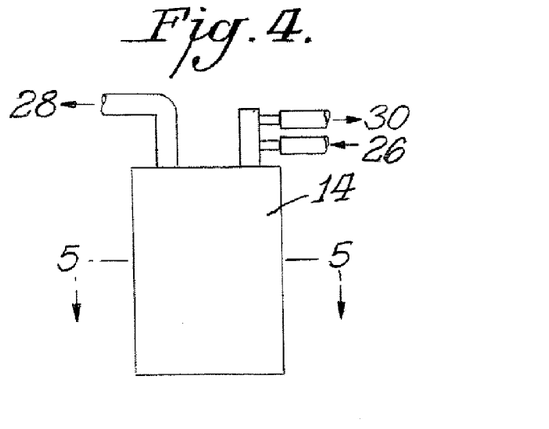
FIG. 4 is a front elevational view of a second embodiment of a filter canister containing a filter material according to the invention.
Figure 5:
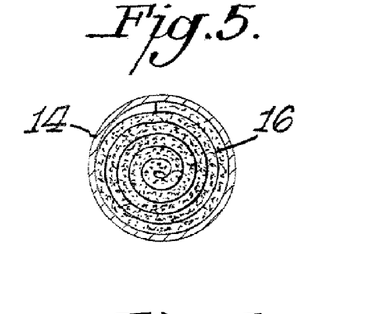
FIG. 5 is a cross-sectional view taken along line 5-5 in FIG. 4.

Referring next to FIGS. 4 and 5, in an alternate hydrocarbon evaporative emissions control system, the filter medium comprises a sheet 16 of urethane foam that has been coiled or rolled like a jelly roll to form a cylinder that fits within the cylindrical chamber of the canister 14. For example, the sheet has a length of 8 to 16 inches, a width of 5 to 10 inches and a thickness of 0.25 to 1 inches, most preferably a length of 12 inches, a width of 6 to 7 inches and a thickness of 0.5 inches.

The filter medium may be formed of a urethane foam, wherein "urethane" means generally the reaction product of an isocyanate and a polyol that contains one or more hydroxyl groups. A preferred urethane foam is a polyether or polyester polyurethane foam with a pore size or pore count in the range of 30 to 300 pores per linear inch, more preferably from 45 to 80 pores per linear inch, most preferably 70 to 80 pores per linear inch. The preferred polyurethane foam has a density in the range of 0.6 to 20 pounds per cubic foot, more preferably about 5 to 10 pounds per cubic foot.

The urethane foam optionally may be thermally or chemically reticulated or networked to remove the cell windows, leaving a network of strands or struts. Reticulation increases void volume and air permeability. A thermal reticulation process is described, for example, in U.S. Pat. No. 3,175,025 to Green, et al. and U.S. Pat. No. 3,171,820 to Volz, et al. A chemical reticulation process is described, for example, in GB 858,127 to Scott Paper Company. Where an ester polyurethane foam is selected for the filter medium, we have found that hydrocarbon absorption is enhanced when such foam has been chemically reticulated.

The filter medium also may be formed from other polymers, such as other urethanes, polyethylenes, polyimides, melamines and acrylics, polyvinyl acetates, polyvinyl alcohols, ethylene vinyl acetates or combinations. The polymers may be foamed, or may be formed into a nonwoven having sufficient fluid/air permeability to serve as a filter. Needled or bonded nonwoven structures formed from fibers or strands of the polymers may be used. U.S. Pat. Nos. 2,958,593, 3,324,609 and 4,490,425 describe various methods of forming nonwoven fiber structures and fabrics.

Figure 6:
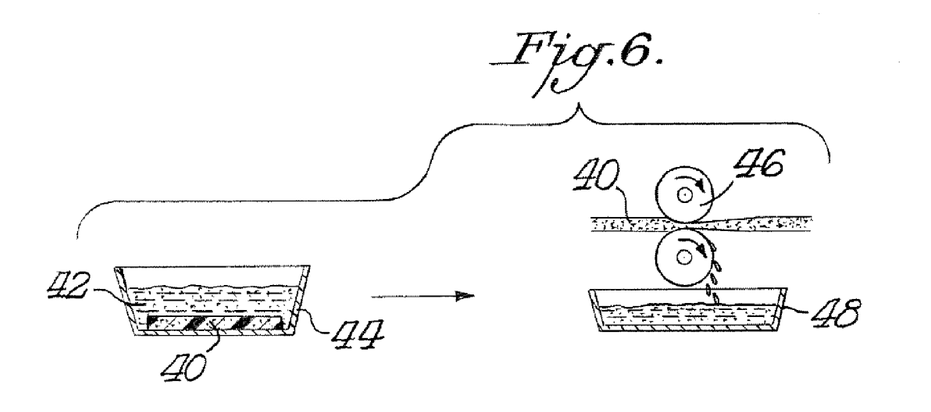
FIG. 6 is a schematic diagram of a dip and nip coating apparatus.

In addition to a sheet of polyurethane foam or a polymeric nonwoven, the polymer network forming the filter medium alternatively may comprise a collection of polymer particles, a collection of shredded particles of foam, a monolith of foam, multiple layers of foam, a coiled sheet of foam, or any combination thereof While we have found that a urethane foam without any coating achieves a desired hydrocarbon absorption and an effective butane working capacity for use as a filter medium in an evaporative hydrocarbon emissions system, it may be desirable to coat the foam before use to vary its performance. If the foam is to be coated or impregnated, one known method is a dip and nip method such as shown in FIG. 6. In the dip and nip method, the foam sheet 40 is immersed in a liquid mixture or slurry 42 of binder and optionally an adsorbent, such as activated carbon, that is held in a tray 44. The wetted foam sheet 40 is then compressed in the nip between a pair of compression rollers 46. Excess slurry is squeezed out of the wetted foam sheet and falls into a recycling tray 48. The dip and nip may be repeated for multiple cycles to achieve a desired coating loading. The impregnated foam is dried before it is inserted into the filter canister chamber. For example, the impregnated foam may be dried in an oven at 200° C. for about 10 minutes.

Representative coating binders include: acrylic binders, acrylonitrile binders, epoxy binders, urethane binders, natural or synthetic rubbers, PVC emulsion binders, and/or a blend of various binders. Preferably the binders are water-based emulsions. The binders with or without added adsorbents may be applied to the foam structure to adjust the hydrocarbon adsorption/absorption efficacy.

Representative activated charcoals include plant (e.g., coconut), wood and/or other renewable material-sourced charcoals, and coal. These activated carbon powders preferably have particle sizes in the range of 100 to 400 mesh (4 to 150 micron), most preferably 325 mesh (45 micron or less). Automotive emission control grade activated carbons are available from various suppliers, including MeadWestvaco, Norit, Calgon, Carbochem and Jacobi. One preferred activated carbon available from MeadWestvaco (Covington, Va.) is NUCHAR® SA-1500, which has a minimum Iodine number of 1200, an apparent density of 21 to 23 lbs/ft$^3$ (337-369 kg/M$^3$), a surface area of 2000 to 2400 m$^2$/g, a pore volume to 1000 Å of 1.3 to 1.5 (cc/g), and a carbon tetrachloride number of 176. Other preferred activated carbons are BXQ, BX-Super and BX-Ultra, which are coal-based activated carbons from Jacobi. BXQ has an apparent density of above 300 g/l, a BWC (g/100 ml) of 12.5 and a carbon tetrachloride number of above 130. BX-Ultra has an apparent density of above 340 g/l, a BWC (g/100 ml) of 10.5 and a carbon tetrachloride number of above 100, and BX-Super has an apparent density of above 360 g/l, a BWC (g/100 ml) of 9.5 and a carbon tetrachloride number of above 90. Yet other activated carbons are XG-752 and XG-652, which are coal-based activated carbons from Calgon, and 208CP and 211CP, which are coconut-based activated carbons also from Calgon. Another coconut-based activated carbon is CP-1 from Jacobi.

Where finer pore size foams are used for the filter medium (such as pore count greater than 45 pores per inch), smaller activated carbon particle sizes should be selected to permit effective coating weight. Activated carbon particles with particle sizes of less than or equal to about 45 microns (0.045 inch) have been found suitable to coat finer pore size foams (e.g., 60 pores per inch).

In addition to activated carbons or charcoals, other possible adsorbents include silicas, silicates, such as diatomaceous earth metals, filter agents, such as Celatom FW80 (CAS# 68855-54-9), and aluminosilicates, such as Fuller's Earth (CAS# 8031-18-3) or Montmorillonite KSF (CAS#1318-93-0).

If a coating is applied to a foam, preferably, one or more binders and one or more activated carbon powders or other adsorbents are combined together with water to form a coating mixture that may be impregnated into or coated onto the foam. In a particularly preferred embodiment a rheology modifier or thickening agent is incorporated into the coating mixture. Other additives may be incorporated into the coating mixture, such as defoamers, surfactants, wetting agents and dispersants.

In the coatings, the ratio of particle (such as activated carbon) to binder can vary from about 1:1 up to about 25:1. Very good particle loading results with coatings having particle to binder ratios of about 15:1.

The filter medium for an evaporative emissions control system canister preferably has an air permeability from 0.1 to 20 inches water pressure drop, more preferably from 0.1 to 5 inches water pressure drop, most preferably up to 2 inches water pressure drop. Typically, when a motor vehicle fuel tank is refilled, the displaced vapors from the tank enter the filter at a flow rate of about 200 cc/min. The hydrocarbon molecules in the vapors attach to the foam filter. Thereafter, when the motor vehicle engine is on, the engine pulls a vacuum and draws air at 20,000 cc/min through the filter. This larger flow rate pulls the hydrocarbon vapor out of the filter and the hydrocarbon molecules away from the filter medium (and the activated carbon if the filter medium is coated), sending them to the engine for combustion. The hydrocarbon absorbing sites are then available to absorb and/or adsorb hydrocarbon molecules during the next re-fueling.

Finer pore size foams (45 to 300 pores per inch) are preferred in view of the higher surface areas for greater active bonding sites, and greater tolerance for higher adsorbent particle loading. The fine pore structure better holds dust than do coarser foam pore structures.

Figure 11:
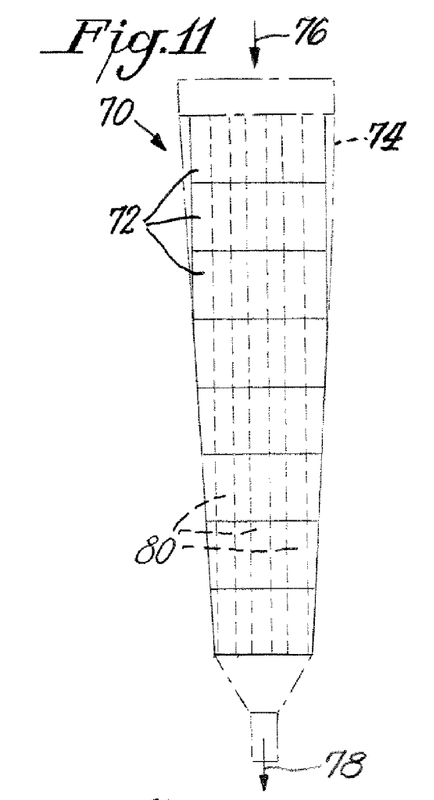
FIG. 11 is a front elevational view of multiple alternative polyurethane foam filter media cylindrical blocks or discs shown in stacked relation within a filter canister housing (shown in phantom outline)

An alternative polyurethane foam filter system 70 for adsorbing hydrocarbon gases is shown in FIG. 11. A series of cylindrical blocks or discs 72 is stacked within the interior volume of a canister 74. Canister 74 is shown in phantom outline in FIG. 11, and there are eight discs stacked therein. Canister 74 has a circular cross section, which tapers from a larger diameter at one end to a smaller diameter at the other end. The cylindrical blocks or discs 72 stacked within the canister 74 may be of the same or different diameters and thicknesses. As shown in FIG. 11, the cylindrical blocks 72 have substantially equal thickness and substantially equal diameter, but have been compressed so as to fit snugly within the canister volume. Filter medium blocks 72 may be provided with other cross-sectional dimensions (e.g., circular, square, irregular) and with other thicknesses to fill canisters of differing interior volume shapes. Varying numbers of blocks 72 may be inserted as desired to achieve desired hydrocarbon adsorption and air now through the canister.

Arrows 76, 78 indicate one direction of gas flow through the canister 74. When hydrocarbons are being adsorbed, gas flows through the canister in one direction. When hydrocarbons are being de-sorbed, usually gas flows through the canister in the opposite direction. Different automotive and equipment manufacturers will design canisters specific to their engine systems.

Figure 12:
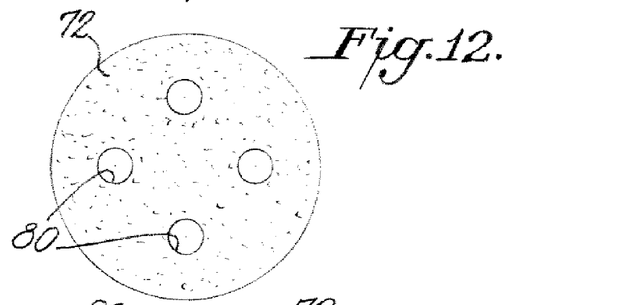
FIG. 12 is a top plan view of one of the alternative polyurethane foam filter media discs of FIG. 11.
Figure 13:
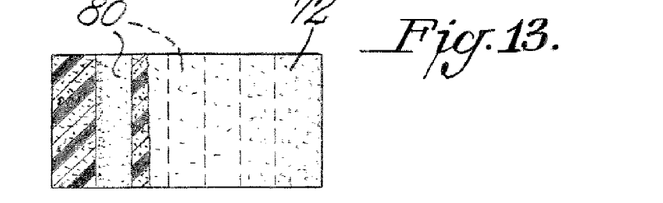
FIG. 13 is a front elevational view in partial cross-section of the polyurethane foam filter media disc of FIG. 12.

Each cylindrical block or disc 72 is formed of a finer pore size polyurethane foam that preferably has been coated with adsorbent particles. The coating penetrates within the pores of the foam. To maintain a desired air flow or gas flow through the filter system comprised of a stack of multiple blocks or discs of coated polyurethane foam with finer pore size, a series of channels 80 are formed through the each cylindrical block 72. Referring to FIGS. 12 and 13, channels 80 are shown as passing through the thickness of the cylindrical block, and as having circular cross-sections. Four channels 80 are shown as passing through the thickness of the disc 72 in FIGS. 12 and 13. The invention is not limited to four channels 80. Rather, any number of channels 80 as may be desired by a particular filter environment may be used.

As shown in FIG. 11, the channels 80 are generally aligned with channels of adjacent cylindrical blocks 72 to form continuous or nearly continuous air or gas flow channels that pass through the canister 74. While substantially aligned channels 80 are preferred, it may be possible to achieve acceptable air permeability when filling a canister volume with filter medium blocks that do not have channels 80 in direct alignment. While not intended to be limiting, representative dimension for cylindrical blocks 72 can be from 1.9 to 2.5 inch in diameter, with a thickness of ⅝ to 1.0 inch. The channels 80 can be generally circular with diameter of about 0.25 inch.

The filter medium has utility within evaporative hydrocarbon emissions control systems used in various motorized vehicles, devices and appliances, such as automobiles, sport utility vehicles, boats, motor cycles, motor scooters, snow mobiles, snow blowers, pick up trucks, all terrain vehicles, lawn mowers, chain saws, power washers, and air blowers. The filter medium may be installed within a canister or housing through which an air or gas stream with entrained hydrocarbons may be passed to form a hydrocarbon emissions control system.

Figure 14:
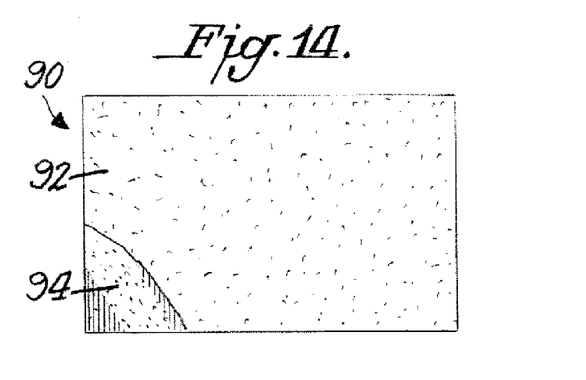
FIG. 14 is a top plan view with a portion cut away of a liner according to the invention.
Figure 15:
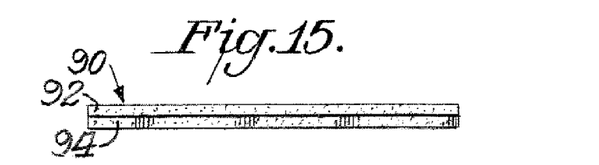
FIG. 15 is a front elevational view of the liner of FIG. 14.

Referring to FIGS. 14 and 15, yet another embodiment of the invention is a hydrocarbon adsorbing liner 90. The liner 90 has a top layer 92 of a polyurethane foam filter media and a bottom layer 94 of a pressure sensitive adhesive, preferably covered with a release paper or sheet for ease of handling. The liner 90 may be applied by the adhesive 94 to a surface within a duct or channel in which hydrocarbon adsorption is desired. Liners 90 are useful in ducts within the emissions systems of motor vehicles to help reduce hydrocarbon emissions. While not intended to be limiting, the liner may have any desired length and width, and the thickness can be from about 3 to about 10 mm, preferably about 4 or 5 mm.

In a preferred liner according to the invention, the polyurethane foam has a finer pore size or pore count in the range of 80 to 300 pores per inch. Most preferably, the finer pore size foam is coated with an adsorbent particle coating. The liner adsorbs hydrocarbons from gas streams that flow past the liner. Preferably, the liner has a butane working capacity (W/W %) of at least 8.0 percent.

For the liner, one suitable pressure sensitive adhesive is 4373M, an acrylic-based pressure sensitive adhesive tape from AdChem. Another alternative is 4352, another acrylic-based pressure sensitive adhesive tape from AdChem. Other possibilities for adhering the liner to a substrate include rubber-based pressure sensitive adhesive tapes, and acrylic-based or rubber-based adhesive coatings.

The following examples further illustrate the present invention. All parts and percentages are expressed by weight unless otherwise specified.

EXAMPLES

Figure 7:
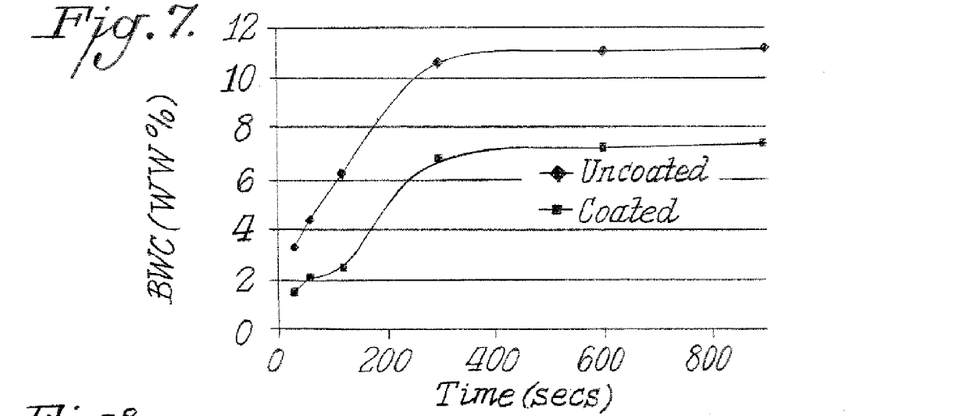
FIG. 7 is a graph of Butane Working Capacity ("BWC") versus Time in seconds comparing the butane absorption of urethane foam and urethane foam coated with an activated carbon coating.
Figure 8:
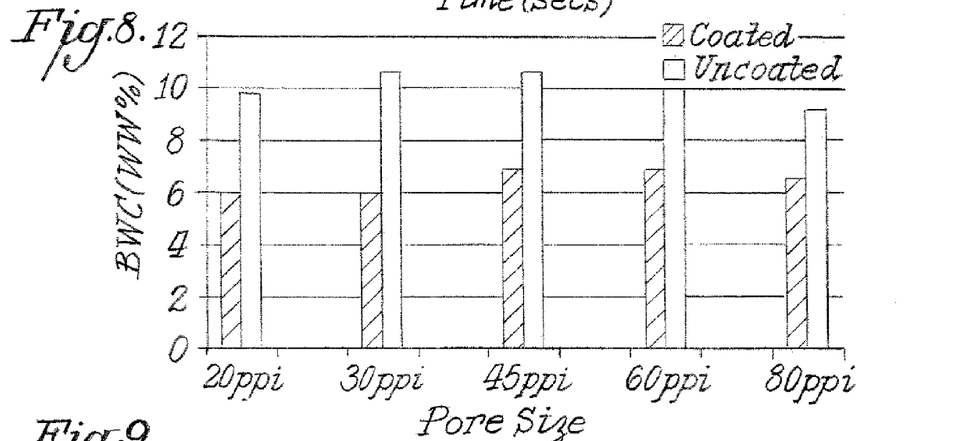
FIG. 8 is a graph of BWC in percent versus foam pore size in pores per inch for coated and uncoated foams of varying pore size.
Figure 9:
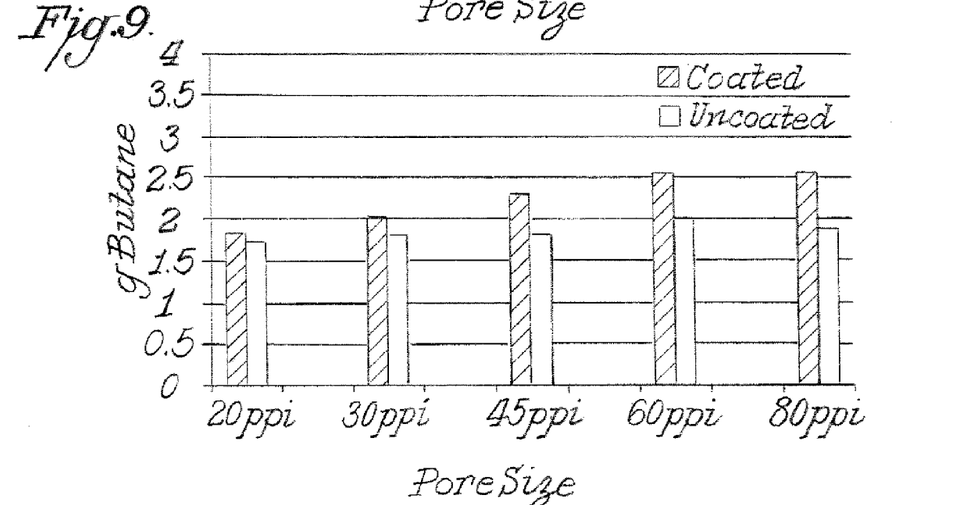
FIG. 9 is a graph of maximum butane absorbed versus foam pore size for coated and uncoated foams of varying pore size.

Polyurethane Foam Compositions—Examples in Tables 1 and 2 (and FIGS. 7 to 9)

Polyether polyurethane foam samples were prepared from the following ingredients:

| Component | Parts per hundred Ether Foam | Parts per hundred Graft Ether Foam |
|---|---|---|
| VORANOL 3010 polyol | 100.0 | 85.0 |
| HS-100 | 0.0 | 15.0 |
| TDI | 63.8 | 56.8 |
| KOSMOS 5-N | 0.31 | 0.31 |
| THANCAT NEM | 1.26 | 1.26 |
| K-29 | 0.08 | 0.08 |
| BLACK PIGMENT | 4.88 | 4.88 |
| L-620 | 0.94 | 0.94 |
| C-124 | 0.79 | 0.79 |
| Deionized water | 4.72 | 4.3 |

"Parts per hundred" denotes parts by weight per hundred parts polyol. VORANOL 3010 is a polyether polyol from Dow Chemical Company. HS-100 is a graft polyol from Bayer. Generally, a graft polyol such as HS-100 increases the stiffness of the resulting foam. TD80 is toluene diisocyanate also from Dow. KOSMOS 5-N and K-29 are tin catalysts from Degussa. THANCAT NEM is an amine catalyst from Air Products and Chemicals of Allentown, Pa. C-124 is an amine catalyst from Crompton. L-620 is a surfactant from GE Silicones (formerly Osi Specialties).

Polyester polyurethane foam samples were prepared from the following ingredients:

| Component | Parts per hundred Ester Foam |
|---|---|
| 1102-50A polyol | 100.0 |
| TD80 | 46.5 |
| SE-232 | 1.0 |
| 33LV | 0.3 |
| THANCAT NEM | 1.2 |
| Deionized water | 3.6 |

1102-50A is a polyester polyol from nolex. SE-232 is a surfactant from GE Silicones. 33LV is a catalyst and THANCAT NEM is an amine catalyst both from Air Products and Chemicals of Allentown, Pa.

In the examples, the polyol(s), water, surfactants, catalysts and pigments were mixed together in a first process stream and combined with the isocyanate at the mixing head of a conventional foam mixer. In some cases, foam densities were adjusted by adjusting water level. The foaming mixture was deposited from the mixer onto a moving conveyer and allowed to rise at room temperature and pressure as it was conveyed away from the mixer. The foam then was allowed to cure for 24 hours before further processing.

To increase air permeability, some of the foam samples were reticulated (either thermally or chemically as indicated below) to remove cell windows from the foam structure to leave a network of interconnected strands with voids therebetween. The voids create fluid flow paths through the reticulated foam structure.

The Butane Working Capacity (BWC) on a weight percent basis (W/W %) and butane absorption was evaluated for polyurethane foams of varying pore size without any adsorbent coatings as reported in Table 1 below.

A portion of the foam samples were also coated with an activated carbon coaling formulation as set out below.

Activated Carbon Coating Formulation

| Component | Weight Percent |
|---|---|
| NUCHAR ® SA carbon | 8.5 |
| BYK-020 | 0.7 |
| RHOPLEX E-358 | 16.0 |
| RHOPLEX HA-12 | 9.0 |
| ACRYSOL RM-825 Premix | 30.5 |
| Deionized water | 35.3 |

The ACRYSOL™ RM-825 Premix consisted of 50% by weight -825 with the balance (50% by weight) deionized water. ACRYSOL™ RM-825 is a rheology modifier and thickening agent available from Rohm and Haas Company of Philadelphia, Pa. RHOPLEX™ E-358 and RHOPLEX™ HA-12 are acrylic binders also available from Rohm and Haas Company.

NUCHAR® SA is an activated carbon available from MeadWestvaco (Covinglon, Va.). Activated carbon powders are also available from Carbochem (Ardmore, Pa.), and Norit (Atlanta, Ga.). The NUCHAR® SA activated carbon powder had a Butane Activity of 61.3%, a surface area of 1926 $m^2/g$, an Iodine number of 1213, and a particle size such that 90% of all particles had diameters of less than 50 microns.

BYK-020 is a defoamer available from BYK-Chemie (Wallingford, Conn.).

The activated carbon, BYK-020, E-358 and HA12 were mixed with approximately one half of the water under ambient temperature and pressure to form a slurry. The RM-825 Premix and remaining water were then added to the slurry and the mixture was mixed with a blender for approximately five to ten minutes to form the activated carbon coating formulation.

The coating formulation was then poured into a holding container or tray. Each sheet of reticulated polyether polyurethane foam having dimensions of 12×18×0.5 inch was immersed into the coating formulation and removed from the coating formulation and passed through the nip between two compression rollers to force the coating formulation through the thickness of the foam sheet thereby coating the foam strands. For the examples, a single impregnating step was used. Each coated foam sheet was then oven dried at 170° C. for twenty to thirty minutes.

Weight gain was calculated by weighing the foam sheet prior to coating and again after coating (weight gain=(coated weight−initial weight)/initial weight). The samples had coating loadings (weight gains) of from 95 to 105%.

"Flake off" is a subjective standard graded as severe, moderate, slight or none, and determined by collecting the particles that fell from the coated foam as the foam was rolled to form the cylinder shape. Coated foams that have excessive flake off could lead to processing difficulties, such as but not limited to, difficulty installing the coated filter into a canister. Severe flake off also may lead to other difficulties, such as but not limited to, reduced vibration stability, clogged vapor lines, and faulty activation of engine warning lights. The solid:binder ratio and/or percent pickup can be optimized to limit flake off, Butane Working Capacity (BWC) on a weight percent basis (W/W %) was determined according to the following procedure. This procedure is a variant of ASTM D5228, which is the Standard Test Method for Determination of the Butane Working Capacity of Activated Carbon. Coated and uncoated foam samples were cut into disk shapes having a diameter of about 3 inches and a thickness of about 0.5 inch. The samples were dried in an oven at 120° C for one hour, then cooled in a dessicator for 15 minutes. The tare weight ("B") of an empty cylindrical canister (6 inches long with an inner diameter of 3 inches) was recorded. Thirteen foam disks were loaded into the canister one atop the other to fill the canister volume. The filled canister was then weighed. The "initial weight" ("C") of the foam-filled canister was recorded.

The foam-filled canister was then attached to a butane source and purged with butane for 15 minutes. The setting on the rotameter was 144 for a flow rate of 250 ml/min. The canister then was closed with a stopper and removed from the butane source. The butane-purged canister was then weighed and the "butane saturated weight" ("D") was recorded. For the Examples in Table 3, a mass flow meter set for a butane source flow rate of 250 ml/min was used.

The butane-purged canister was then attached to a nitrogen gas source and purged with nitrogen for 30 minutes. The setting on the rotameter was 150 for a flow rate of 400 ml/min. After the nitrogen purge, the canister was closed with a stopper and removed from the nitrogen source. The final weight of the purged canister was recorded ("E"). For the Examples in Table 3, a mass flow meter set for a nitrogen flow rate of 300 ml/min was used.

The weight (grams) of butane absorbed was calculated as "D"−"E". The weight (grams) of the foam filter medium was calculated as "C"−"B". BWC on a weight percent basis (W/W %) was calculated as grams butane divided by grams of foam filter medium, which is then multiplied by 100%.

Each foam grade and pore size, coated and uncoated, was tested using this procedure at least twice, and the average values were recorded.

The honeycomb extrusion activated carbon filter medium presently used in the automotive industry had a butane working capacity of 7.0 to 8.0%.

The BWC values for filters with either uncoated or coated foams according to the invention are set out in Tables 1 and 2 and illustrated in FIGS. 7, 8 and 9.

TABLE 1

Dynamic Butane Absorption

| Butane Dwell Time (sec) | Uncoated | | Coated | |
|---|---|---|---|---|
| | g Butane | BWC (W/W %) | g Butane | BWC (W/W %) |
| 30 | 0.56 | 3.3 | 0.50 | 1.5 |
| 60 | 0.74 | 4.4 | 0.67 | 2.1 |
| 120 | 1.05 | 6.1 | 0.80 | 2.4 |
| 300 | 1.75 | 10.6 | 2.19 | 6.7 |
| 600 | 1.77 | 11.0 | 2.33 | 7.1 |
| 900 | 1.76 | 11.1 | 2.38 | 7.3 |

A polyether polyurethane foam of the formulation identified above had a pore size of 45 ppi. The calculated surface area of the foam was 848 ft$^2$/ft$^3$. The butane flow rate was 250 ml/min. The data from Table 1 are set out in graphical for in FIG. 7.

Figure 10:
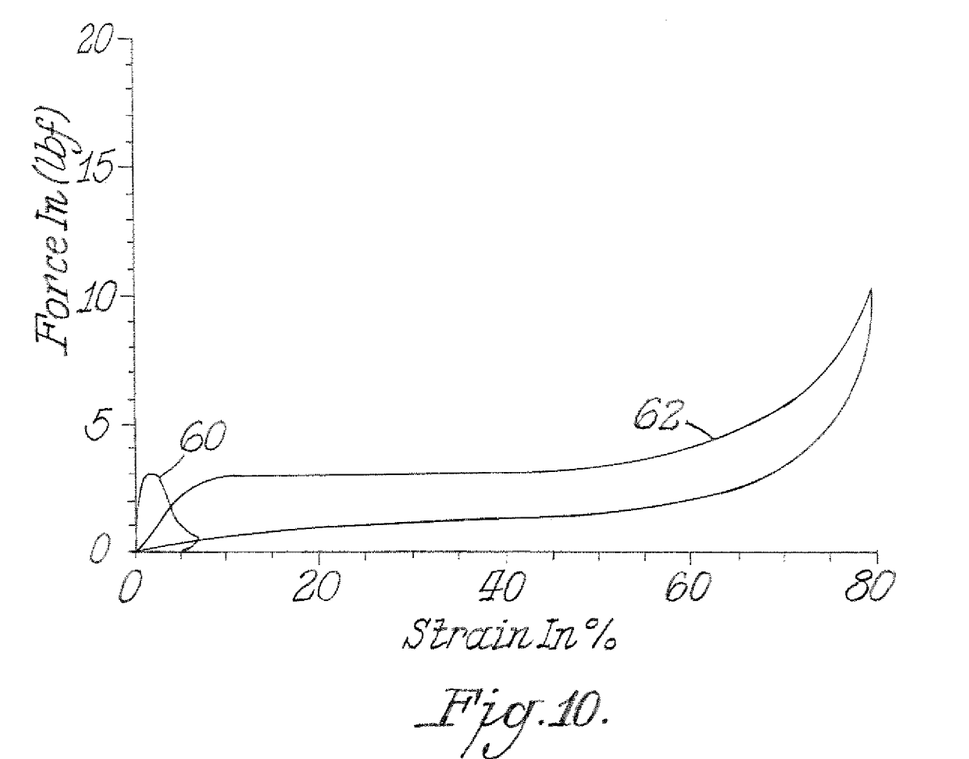
FIG. 10 is a graph of force versus strain showing hysteresis curves for a polyurethane foam filter media as compared to a conventional honeycomb carbon extrusion.

During fabrication and shipping, honeycomb extrusion activated carbon filters are notably fragile and easily damaged. A honeycomb extrusion was tested under compression according to a test method set out in ASTM 3574 using a Zwick Z010 materials testing machine. The 2.0"×1.5"×0.25" sample was subjected to a low-velocity compressive force (2 inch per minute cross head speed). As the compression force on the sample increased over time, the strain and the force increased. At a strain of about 0.8%, the force started to drop, indicating that some layers within the honeycomb had collapsed. On further compression, the force required dropped further. At 7% strain, the honeycomb layers completely collapsed, as the measured force was zero. In ASTM 3574, hysteresis is the percent area between the IFD-strain curve and the return curve. The hysteresis for the honeycomb was 100%. FIG. 10 shows the hysteresis curves for the honeycomb extrusion 60 and for a comparison polyurethane foam filter media 62.

In comparison to the honeycomb extrusion, a polyurethane foam filter media is resilient and readily fabricated and shipped. A foam sample having dimensions of 2"×2"×1" was also tested using the ASTM 3574 test method at a 2 inch per minute cross head speed. At forces that compressed the foam sample to 80% compression, the foam structure did not crumble (See FIG. 10). The hysteresis for the polyurethane foam sample was 60%. A sample with a lower hysteresis is more resilient and less subject to crumbling upon fabrication and shipping.

TABLE 2

BWC for Coated and Uncoated Foams with Varying Pore Size

| | Uncoated | | Coated | |
|---|---|---|---|---|
| | g butane | BWC (W/W %) | g butane | BWC (W/W %) |
| Ether foams Pore size reticulated (1.4 pcf) | | | | |
| 20 ppi | 1.74 | 9.8 | 1.9 | 5.9 |
| 30 ppi | 1.81 | 10.6 | 2.0 | 6.0 |
| 45 ppi | 1.81 | 10.6 | 2.3 | 6.9 |
| 60 ppi | 1.98 | 9.9 | 2.6 | 6.9 |
| 80 ppi | 1.82 | 9.1 | 2.6 | 6.5 |
| 88 ppi | 1.82 | 11.4 | — | — |
| Higher density (4.3 pcf) | | | | |
| 60 ppi Nonreticulated (1.4 pcf) | 2.89 | 6.7 | — | — |
| 20 ppi | 1.79 | 10.8 | — | — |
| 30 ppi | 1.84 | 10.5 | — | — |
| Lower density (0.7 pcf) | | | | |
| 60 ppi Graft Ether Reticulated (1.9 pcf) | 1.54 | 16.6 | — | — |
| 25 ppi Ester foams Reticulated (2 pcf) | 2.02 | 9.0 | — | — |
| 20 ppi | 1.30 | 6.1 | — | — |
| 60 ppi | 1.31 | 6.3 | — | — |
| 75 ppi (chem . . . ret.) | 1.48 | 5.8 | — | — |
| 75 ppi Nonreticulated (2 pcf) | 1.47 | 6.6 | — | — |
| 75 ppi Melamine foam | 1.48 | 5.9 | — | — |
| Basotec (0.6 pcf) Honeycomb Activated carbon (Comparison) | 1.23 | 20.8 | — | — |
| Small cylinder 28.5 g | 2.15 | 7.5 | — | — |
| Large Cylinder 76 g | 6.04 | 7.9 | — | — |

The calculated surface areas for the different pore sizes are as follows:

| | |
|---|---|
| 20 ppi | 325 ft$^2$/ft$^3$ |
| 30 ppi | 525 ft$^2$/ft$^3$ |
| 45 ppi | 848 ft$^2$/ft$^3$ |
| 60 ppi | 1190 ft$^2$/ft$^3$ |
| 75 ppi | 1549 ft$^2$/ft$^3$ |
| 80 ppi | 1672 ft$^2$/ft$^3$ |
| 90 ppi | 1921 ft$^2$/ft$^3$ |

Polymer networks with a greater surface area that may be contacted by the hydrocarbons entrained in a gaseous fluid stream generally have higher hydrocarbon absorption. However, networks with smaller pore sizes (e.g. 80 ppi and 90 ppi) can also have lower air permeabilities, which can limit contact between the hydrocarbons and the polymer material internal to the polymer network, and thus reduce hydrocarbon absorption.

FIG. 7 is a graph of the dynamic BWC (W/W %) over time for the coated and uncoated polyether polyurethane foam samples having a pore size of 45 ppi.

FIG. 8 is a graph comparing the BWC (W/W %) for coated and uncoated polyether polyurethane foams at varying pore sizes from 20 ppi to 80 ppi. In all cases, the uncoated polyurethane foams have a higher BWC (W/W %).

FIG. 9 is a graph comparing butane absorption (in grams or g butane) for coated and uncoated polyether polyurethane foams at varying pore sizes from 20 to 80 ppi. The adsorbent coating increases the adsorption of butane, but also increases sample weight and results in other problems associated with coatings, such as flake off. The uncoated foams have greater resilience, and do not have particulates that may flake off during use.

Those seeking to develop a filter medium for evaporative hydrocarbon emissions may tailor the performance by adding a coating or an adsorbent coating. We have found that uncoated filter media have excellent butane working capacity and satisfactory hydrocarbon absorption to use in secondary evaporative emission filters, among other uses.

Polyurethane Foam Compositions—Examples in Table 3

Various activated carbon coated foams were prepared as set out in Table 3. The activated carbon coating materials are set out by trade designation, with the ratio of carbon to binder as specified (carbon:binder). The activated carbons were selected with particle sizes less than 3 microns.

The polyurethane foam had pore size of 77 pores per inch, and was reticulated. The binder formulation for the coatings was an acrylic binder TR-934HS from Rohm and Haas, a defoamer (byk 020) and a wetting agent (disperbyk) both from Byk-Chemie, and a thickener (ASE-60), which is an alkali swellable acrylic emulsion from Rohm and Haas. Coating pick up is expressed as a percentage: e.g., 285% PU.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for removing hydrocarbons from a gaseous stream emitted from a fuel tank during refueling of a motor vehicle, device or appliance with a hydrocarbon-based fuel consuming engine, comprising:

installing a filter in a flow path established between the fuel tank and an exhaust from the fuel tank, wherein said filter comprises two or more foam blocks aligned in stacked relation within a canister, and wherein the foam forming said blocks has a pore count between about 45 and 300 pores per inch and has been coated with an adsorbent particle coating, and further wherein each foam block defines at least one channel having a channel axis extending in the direction of the flow path formed therein through which a gas may flow and said channels of adjacent foam blocks are substantially axially aligned.

2. The method of claim 1, wherein the polymer network has an air permeability of 0.1 to 20 inches water pressure drop.

3. The method of claim 1, wherein the foam is selected from the group consisting of polyether polyurethane foam, polyester polyurethane foam and melamine foam.

4. The method of claim 1, wherein the foam is reticulated before the coating is applied.

5. The method of claim 1, wherein the coating comprises one or more materials selected from the group consisting of activated carbons, silicas, silicates, aluminosilicates, filter agents, molecular sieves, flame retardants, electrically conductive materials, antimicrobial additives, germicides, pigments and colorants.

6. The method of claim 1, wherein said filter has a butane working capacity (W/W%) of at least 8.0 percent.

7. The method of claim 1, wherein the foam has a pore count of from 45 to 80 pores per inch.

TABLE 3

| | Density (pcf) | BWC (w/w %) at 70° F. | BWC (w/w %) at 105° F. | % Desorbed after 30 min. at 105° F. | Flake off (mg) | BWC (w/v) at 70° F. | BWC (w/v) at 105° F. |
|---|---|---|---|---|---|---|---|
| 3:1 25% of SA-1500 and 75% CP1 285% PU | 9.3 | 8.9 | 8.5 | 73.6 | | 0.0133 | 0.0125 |
| 5:1 BX-Super 280% PU | 8.7 | 10.2 | 10.0 | 78.3 | 0.2 | 0.0143 | 0.0140 |
| 10:1 BX-Super 280% PU | 8.5 | 10.9 | 10.8 | 83.8 | 1.6 | 0.0148 | 0.0147 |
| 15:1 BX-Super 277% PU | 9.9 | 12.5 | 12.7 | 82.6 | 5.5 | 0.0200 | 0.0201 |
| 20:1 BX-Super | | 12.8 | | | 7.8 | | |
| 25:1 BX-Super 282% PU | 8.1 | 12.9 | 12.4 | 83.5 | 13.3 | 0.0168 | 0.0160 |
| 57:1 BX-Super 275% PU | 7.1 | 12.6 | | | 42.9 | 0.0142 | |
| 5:1 BX-Super and 17.5 SA1500 280% PU | 9.3 | 12.4 | 11.7 | 86.3 | 0.6 | 0.0183 | 0.0173 |

8. A system for extracting evaporative hydrocarbon emissions from a motorized vehicle, device or appliance, comprising:

a housing defining an inner chamber;

an inlet through which a gas stream containing a hydrocarbon enters the inner chamber;

an outlet from which a gas stream exits the inner chamber; and a filter in the inner chamber, said filter comprising two or more foam blocks that are aligned in stacked relation within the inner chamber, wherein the foam forming said blocks has a pore count between about 45 and 300 pores per inch and has been coated with an adsorbent particle coating, and further wherein each foam block defines at least one channel having a channel axis extending in the direction of the flow path formed therein through which a portion of the gas stream may flow and said channels of adjacent foam blocks are substantially axially aligned.

9. The system of claim 8, wherein the foam has an air permeability of 0.1 to 20 inches water pressure drop.

10. The system of claim 8, wherein the foam is selected from the group consisting of polyether polyurethane foam, polyester polyurethane foam and melamine foam.

11. The system of claim 8, wherein the foam is reticulated before the coating is applied.

12. The system of claim 8, wherein the coating comprises one or more materials selected from the group consisting of activated carbons, silicas, silicates, aluminosilicates, filter agents, molecular sieves, flame retardants, electrically conductive materials, antimicrobial additives, germicides, pigments and colorants.

13. The system of claim 8, wherein said filter has a butane working capacity (W/W%) of at least 8.0 percent.

14. The system of claim 8, wherein the foam has a pore count of from 45 to 80 pores per inch.

15. The system of claim 8, wherein the housing has a generally cylindrical shape which tapers from a larger cylindrical diameter at or near one end to a smaller cylindrical diameter at or near the other end.

16. The system of claim 8, wherein the foam blocks have cylindrical diameters.

17. The system of claim 8, wherein the foam blocks have substantially equal cylindrical diameters.

18. The system of claim 15, wherein the foam blocks have cylindrical diameters, and the cylindrical diameter of the foam blocks is larger than the smaller cylindrical diameter of the housing.

\* \* \* \* \*